United States Patent
Markham

(10) Patent No.: US 11,957,107 B2
(45) Date of Patent: Apr. 16, 2024

(54) PET TOY

(71) Applicant: Bounce, Inc., Golden, CO (US)

(72) Inventor: Joseph P. Markham, Golden, CO (US)

(73) Assignee: BOUNCE ENTERPRISES LLC, Golden, CO (US)

( * ) Notice: Subject to any disclaimer, the term of this patent is extended or adjusted under 35 U.S.C. 154(b) by 33 days.

(21) Appl. No.: 17/198,498

(22) Filed: Mar. 11, 2021

(65) Prior Publication Data
US 2022/0287274 A1   Sep. 15, 2022

(51) Int. Cl.
*A01K 15/02* (2006.01)

(52) U.S. Cl.
CPC .................. *A01K 15/026* (2013.01)

(58) Field of Classification Search
CPC ..... A01K 15/026; A01K 15/025; A01K 15/02
See application file for complete search history.

(56) References Cited

U.S. PATENT DOCUMENTS

| | | | |
|---|---|---|---|
| RE34,352 E * | 8/1993 | Markham ................. | A61D 5/00 119/710 |
| 6,439,166 B1 * | 8/2002 | Markham ............ | A01K 15/026 119/710 |
| D515,253 S | 2/2006 | Viola | |
| D825,116 S | 8/2018 | Wills et al. | |
| D884,296 S | 5/2020 | Gick | |
| 10,716,290 B1 * | 7/2020 | Dewey ................. | A01K 15/026 |
| D908,294 S | 1/2021 | Liang | |
| 2009/0038560 A1 | 2/2009 | Markham | |
| 2012/0204809 A1 | 8/2012 | Alelrod et al. | |
| 2013/0247836 A1 * | 9/2013 | Axelrod ............... | A01K 15/026 119/709 |
| 2013/0273125 A1 * | 10/2013 | Barnvos ................. | A23K 10/26 264/237 |
| 2014/0060451 A1 | 3/2014 | Oblack et al. | |
| 2015/0040837 A1 * | 2/2015 | Axelrod ............... | A01K 15/026 119/709 |
| 2015/0237829 A1 * | 8/2015 | Tsengas ............... | A01K 15/025 119/707 |

(Continued)

OTHER PUBLICATIONS

International Search Report and Written Opinion in International Application No. PCT/US22/20011 dated May 23, 2022, 13 pages.

*Primary Examiner* — Trinh T Nguyen
(74) *Attorney, Agent, or Firm* — Berg Hill Greenleaf Ruscitti LLP

(57) ABSTRACT

The invention is a pet toy having an elongate neck that interconnects two enlarged ends. The enlarged ends have spheroid shapes from a side view and circular shapes from an end or plan view. The pet toy is symmetrical about its longitudinal axis and its transverse axis. The pet toy has numerous external features formed on the outer surface thereof that provide functional advantages. One group of external features includes ribs or stiffeners provided in various geometric arrangements on the neck and enlarged ends. Another group of external feature include a plurality of protrusions or protuberances. The protrusions are smaller in size as compared to the ribs. The shape of the pet toy resembles a dumbbell. The pet toy is preferably made of an elastomeric and flexible material that enhances play action with an animal. The invention further includes a method of entertaining an animal by using the toy.

20 Claims, 5 Drawing Sheets

(56) References Cited

U.S. PATENT DOCUMENTS

2017/0020109 A1\* 1/2017 Dewey ..................... F16B 7/20
2017/0020110 A1\* 1/2017 Axelrod ............... A23K 20/163
2017/0094943 A1\* 4/2017 Wilson ................ A01K 15/025
2018/0271061 A1\* 9/2018 Spivak ................ A01K 15/026

\* cited by examiner

PET TOY

FIELD OF THE INVENTION

The invention relates to pet toys, and more particularly, to a pet toy having an outer surface with a plurality of ribs and protrusions that enhance stimulation for a pet to interact with the toy. The invention is also provided in a unique shape that further enhances pet interaction.

BACKGROUND OF THE INVENTION

One category of pet toys is those made of a flexible or elastomeric material, such as rubber. These toys, if made from quality materials, can withstand the biting action of an animal and can keep an animal occupied for extended periods of time. It is known to place treats in these types of toys to increase the interaction of the animal with the toy. A sound emitting device, often referred to as a "squeaker", is also known to be placed inside the toy to further stimulate the animal.

Another general category of pet toys are those which may generally be referred to as "plush" toys. These types of toys are made from different types of cloth or fabric. The plush toy is typically stuffed with a fibrous material, such as polyester stuffing, to provide the toy with an increased thickness or bulk that enables the animal to chew on the toy. Plush toys may also include squeakers to further stimulate the animal.

Yet another category of pet toys is those that are woven into desired shapes. Nylon rope can be used in which fibers are woven into strands of a desired size and shape.

Yet another category of pet toys is those that are not intended to be chewed but provide stimulation to an animal by dispensing treats or by emitting sounds. These interactive pet toys are sometimes made of plastic materials that do not encourage chewing by the animal but rather encourage interaction by the specific sensory feature targeted, such as taste, smell, or sound.

One common limitation or drawback with respect to chew toys is that they are prone to easy destruction by chewing. Many such toys do not use quality materials. The result is that the toys are easily destroyed and therefore provide limited value to the owner. Many of these toys also present a health hazard because pieces of the toy can be ingested by the animal. Even for quality chew toys, the animal may lose interest over time because the shape and general construction of the toy does not present any new challenges to the animal. In other words, for a chew toy such as a rubber ball, an animal interacting with the ball is never presented the opportunity to grasp or hold the ball in any different manner since the ball is spherical shaped and will be presented to the mouth of the animal in the same shape and size each time.

While chew toys are not limited to rubber balls, the same general defects apply however with respect to many chew toys in that the shapes of the chew toys do not present the animal with any potentially different configurations as the toy is chewed, held, or otherwise retained in contact with the animal.

SUMMARY OF THE INVENTION

In a preferred embodiment of the invention, it includes a pet or animal toy having a generally cylindrical shaped neck that interconnects two enlarged ends. As seen from a front or rear elevation view, the enlarged ends can be described as having bulbous or spheroid shapes. When viewing the invention from an end view, the enlarged ends are arcuate shaped and more specifically, can be further described as having a circular shape. The pet toy is symmetrical about its longitudinal axis and its transverse axis.

The pet toy incorporates a number of external features that provide functional advantages. One group of external features includes ribs or stiffeners that are disposed on the outer surface of the pet toy in various geometric arrangements. One first set of ribs extends along a length of the neck and parallel with the longitudinal axis. This first set include at least two ribs that are spaced from one another about the periphery of the neck. In one preferred embodiment of the invention, four ribs are provided, each being spaced substantially equidistant about the periphery of the neck. Another second set of ribs are provided that extend beyond the neck onto portions of the enlarged ends that face one another. Another third set of ribs include those that extend beyond the second set of ribs and which reside on the outside ends or surfaces of the enlarged ends. The first, second, and third sets of ribs may connect to one another such that the appearance of a single rib is presented that extends linearly and continuously along the entire length of the pet toy and substantially parallel with the longitudinal axis. Like the first set of stiffeners the second and third set of stiffeners are equally spaced from one another around the enlarged ends.

Yet another fourth set of stiffeners is provided that are located on the peripheral edges of the enlarged ends. These stiffeners extend continuously around or circumferentially around the peripheral edges which enables the toy to roll along the ground.

Another type of external feature provided on the exterior surface of the pet toy include a plurality of protrusions or protuberances disposed on the neck and on selected portions of the enlarged ends. The protrusions are smaller in size as compared to the ribs.

According to a preferred embodiment, the ribs may have geometric shapes including flat or planar exposed top surfaces and flat or planar side surfaces that interconnect the top surfaces to the outer surface of the pet toy.

According to a preferred embodiment, the protrusions may have rounded or curved shapes that protrude from the outer surface of the pet toy.

According to another conceptual view of the invention, the shape of the pet toy resembles a dumbbell however the numerous external features of the toy gives it a distinct visual appearance.

In another preferred embodiment of the invention, it includes a method of stimulating or entertaining an animal by introduction of the pet toy to the animal and allowing the animal to play and interact with the pet toy taking advantage of its many different structural features. The method may include various actions associated with the stimulation or entertainment such as bouncing of the pet toy, chewing of the pet toy in which the pet toy rebounds to its un-deformed shape, rolling of the pet toy, and combinations thereof. An owner may also engage in fetch and retrieve with an animal.

Considering the foregoing features and attributes of the invention, in one particular aspect of the invention, it may be considered a pet toy comprising: a neck; a first enlarged end connected to a first end of the neck; a second enlarged end connected to a second opposite end of the neck; a plurality of ribs disposed on said neck and said first and second enlarged ends; and wherein a first group of ribs is disposed on and extends longitudinally along said neck, a second group of ribs is disposed on and extends continuously with set first set of ribs onto said first and second enlarged ends, and a third group of ribs is disposed on and extends circumferentially around a periphery of each of said enlarged ends.

A number of optional features may be combined with the first aspect of the invention, these optional features may be provided individually or in selected combinations, these optional features including: (a) the pet toy is symmetrical about a longitudinal axis thereof; (b) the pet toy is symmetrical about a transverse axis thereof; (c) a plurality of protrusions disposed on said neck and spaced from said first group of ribs; (d) a plurality of protrusions disposed on said neck and said enlarged ends, said plurality of protrusions spaced from said first group of ribs; (e) wherein said plurality of ribs extend linearly upon the surfaces to which they are attached; (f) wherein said plurality of ribs each have a planar outer surface and planar side surfaces connected to opposite sides of said planar outer surface (g) a plurality of concentric ribs disposed on at least one of said enlarged ends; (h) wherein a length of the neck exceeds a distance the enlarged ends extend outward and beyond an outer surface of the neck; (i) wherein a diameter of the enlarged ends exceeds a length of the neck; (j) a diameter of the enlarged ends is greater than a distance the enlarged ends extend outward and beyond an outer surface of the neck; and (k) the diameter of the enlarged ends is at least twice as large as the distance enlarged ends extend outward and beyond an outer surface of the neck.

According to a second aspect of the invention, it may be considered a pet toy comprising: a neck; a first enlarged end connected to a first end of the neck; a second enlarged end connected to a second opposite end of the neck; a plurality of ribs disposed on said neck and said first and second enlarged ends; and wherein said pet toy has a dumbbell shape in which a diameter of the enlarged ends exceeds a length of the neck.

A number of optional features may be combined with the second aspect of the invention, these being one or more of the optional features set forth with respect to the first aspect of the invention.

According to a third aspect of the invention, it may be considered a method of entertaining an animal comprising: providing an elastomeric and flexible pet toy having a neck, a first enlarged end connected to a first end of the neck, a second enlarged end connected to a second opposite end of the neck, and a plurality of ribs disposed on said neck and said first and second enlarged ends; presenting the pet toy to the animal; tossing the pet toy causing the pet toy to bounce or roll; and wherein the animal subsequently plays with the pet toy by grasping the pet toy in its mouth or holds the pet toy with its paws, such that the pet toy deforms in shape in response to pressure applied to the pet toy.

A number of optional features may also be combined with the third aspect of the invention, these being one or more of the optional features set forth with respect to the first aspect of the invention.

According to a fourth aspect of the invention, it may be considered a method of entertaining an animal comprising: providing an elastomeric and flexible pet toy having a neck, a first enlarged end connected to a first end of the neck, a second enlarged end connected to a second opposite end of the neck, and a plurality of ribs disposed on said neck and said first and second enlarged ends; presenting the pet toy to the animal; tossing the pet toy in a body of water causing the pet toy to float in the water; and wherein the animal subsequently plays with the pet toy by grasping the pet toy in its mouth by biting on the neck.

Other features and advantages of the invention will become apparent from the following detailed description considered in conjunction with the corresponding drawings.

BRIEF DESCRIIPTION OF THE DRAWINGS

DETAILED DESCRIPTION

Figure 1:
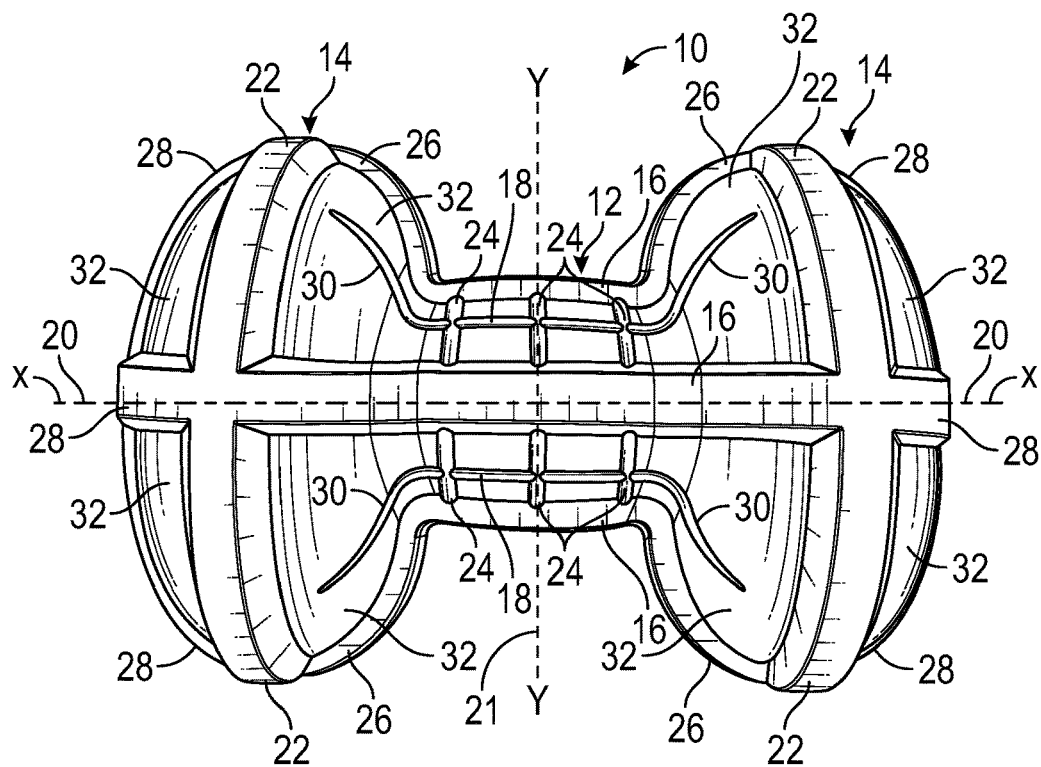
FIG. 1 is a front elevation view of the pet toy of the invention according to a preferred embodiment.
Figure 2:
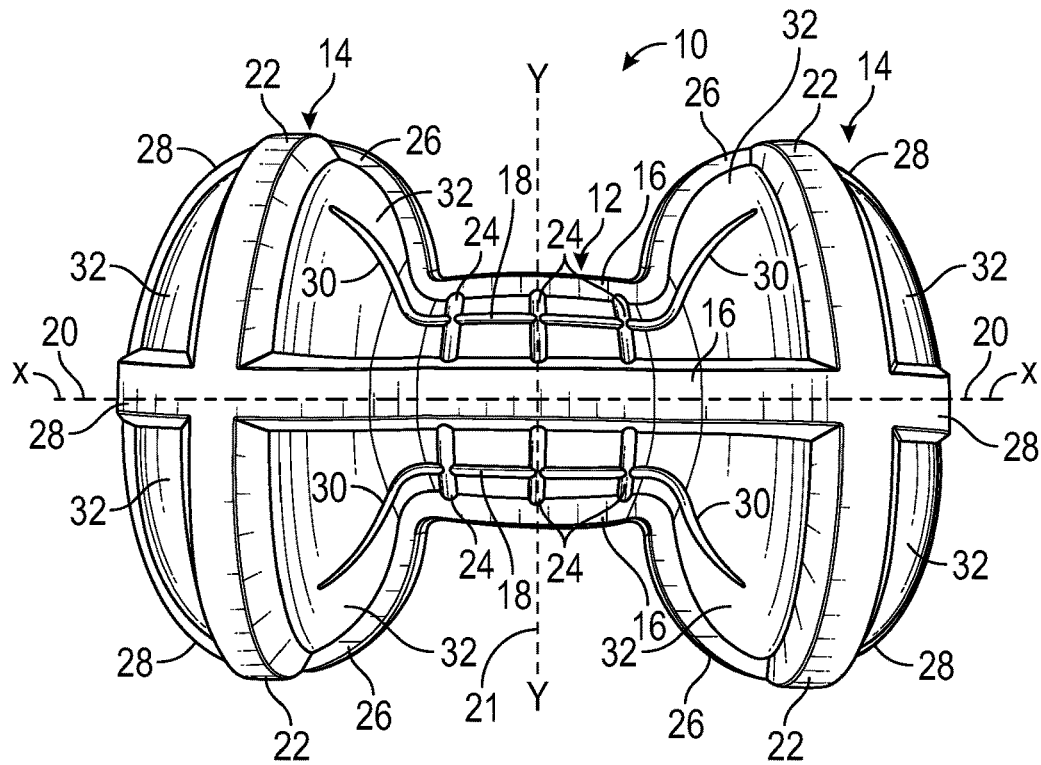
FIG. 2 is a rear elevation view of the pet toy of the invention, noting the rear elevation view is a mirror image of the front elevation view.

FIGS. 1 and 2 illustrate a preferred embodiment of the invention showing the animal toy 10 in front and rear elevation views, respectively. The rear elevation of the toy 10 shows that it is a mirror image of the front elevation view. The various structural elements of the toy 10 are shown which include the neck 12 and the enlarged ends 14 attached to each end of neck. The neck 12 extends substantially linearly along the longitudinal axis 20 (axis X-X). The enlarged ends 14 can be described as bulbous or spheroid shaped as seen from the front elevation view. The enlarged ends 14 have major axes or sides that extend substantially perpendicular to the longitudinal axis 20 and minor axes or sides that extend along the longitudinal axis 20. FIGS. 1 and 2 also show transverse axis 21 (Y-Y) that extends perpendicular to the longitudinal axis 20. The figures show that the toy 10 is symmetrical about both axes 20 and 21.

Figure 3:
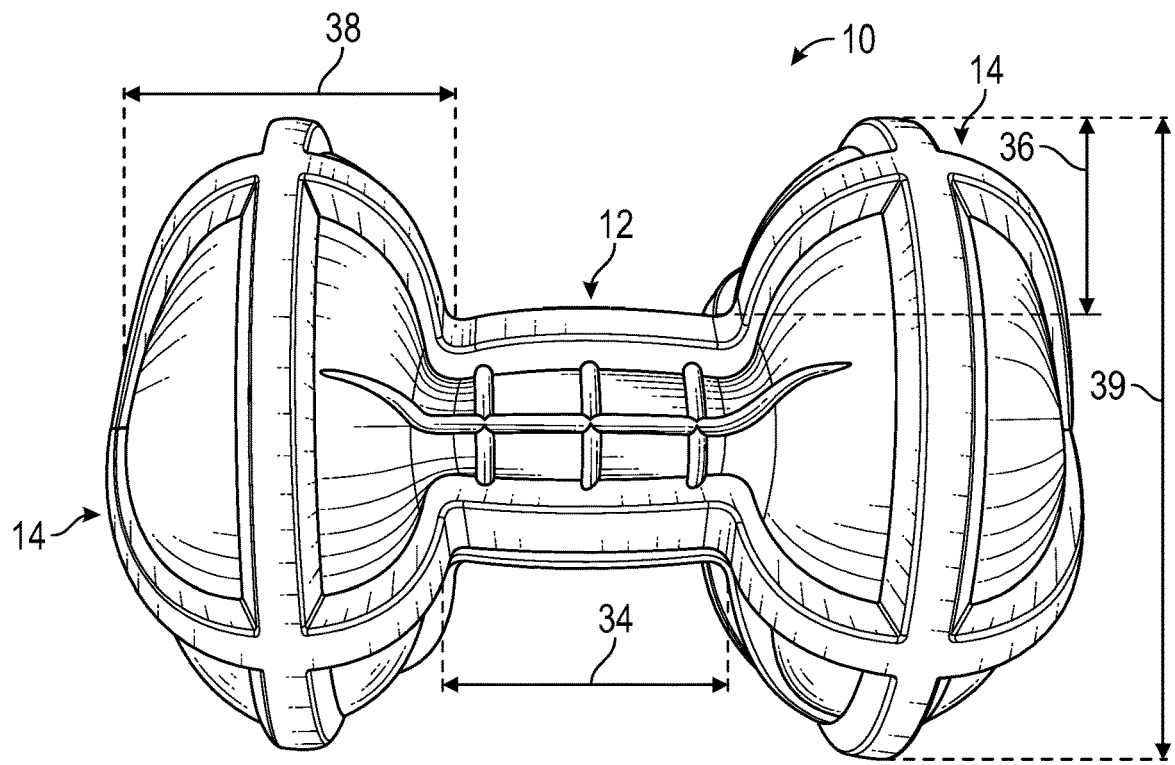
FIG. 3 is a slightly enlarged elevation view of the pet toy of the invention and the pet toy being slightly rotated about its longitudinal axis as compared to the front elevation views of FIGS. 1 and 2.
Figure 4:
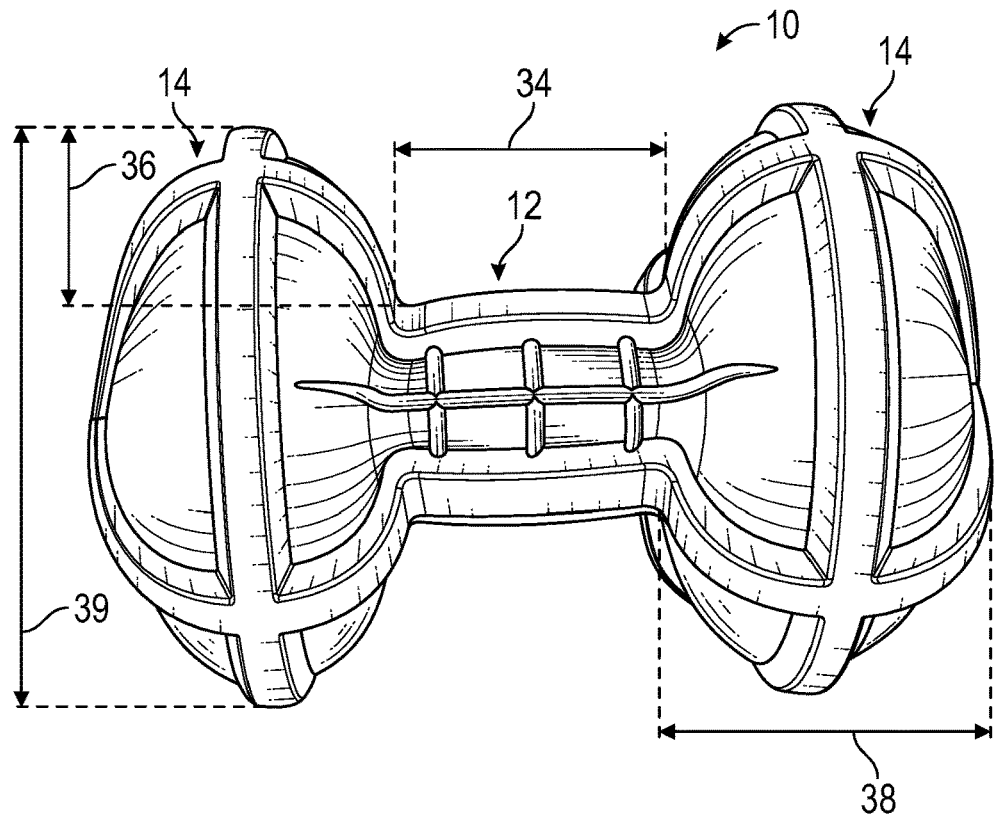
FIG. 4 is an opposite side elevation view of the pet toy of FIG. 3.

FIG. 3 is a slightly enlarged side elevation view of the pet toy 10 in which the pet toy is slightly rotated about its longitudinal axis 20 as compared to the front elevation views of FIGS. 1 and 2. FIG. 4 is an opposite side elevation view of the pet toy of FIG. 3.

Various external features are provided on the exterior surface of the toy. These external features facilitate many functions as discussed in detail below. The areas on the exposed or outer surface of the toy that do not have external features are shown as areas 32. These areas 32 are illustrated as being substantially smooth and void of disruptions.

One group or type of external features includes longitudinal or lengthwise stiffeners or ribs 16 on the neck 12. As shown, there are four longitudinal ribs 16, each being spaced from one another a substantially equal distance along a periphery of the neck 12. It should be appreciated from the drawings that these four longitudinal ribs 16 provide substantial support to the neck of the toy.

Another set of stiffeners or ribs are those that are shown as ribs 26 that extend beyond the neck 12 onto the portions of the enlarged ends 14 that face one another or face inwardly towards the transverse axis Y-Y. These ribs 26 can also be defined as continuous extensions of the ribs 16, noting that the ribs 16 and ribs 26 have the same shape and size.

Yet another set of stiffeners or ribs are those shown as ribs 28 that extend beyond the ribs 26 and that are located on the outside or end services of the enlarged ends 14. These ribs 28 can also be defined as continuous extensions of the ribs 16 and 26, noting again that the ribs 28 have the same shape and size.

The longitudinal ribs 16, 26 and 28 create additional surface area on the pet toy which enables an animal to grasp and hold the pet toy in the animal's mouth or paws in many different angles or orientations. Compare these ribs to many prior art pet toys in which the outer surface of these prior art pet toys are devoid of external features.

Although the sets of ribs 16, 26 and 28 are shown as having a constant shape and size, is also contemplated that any one of these sets of ribs could be modified in shape or size in order to accommodate a specific function of the pet toy as it may relate to the type of animal whose to be present at the toy, and the specific functions for which the ribs are provided.

Yet another set of stiffeners or ribs of those shown as ribs 22 that are located on the peripheral edges of the enlarged ends 14. As shown, these ribs 22 extend continuously around the peripheral edges. The ribs therefore are oriented substantially perpendicular to the ribs 16, as seen from the front and rear elevation views of FIGS. 1 and 2. The ribs 22 enable the toy 10 to roll easily along the ground, noting the ribs employ flat outer sides 50 as described below with reference to FIG. 5.

Another type of external feature provided on the exterior surface of the pet toy include a plurality of protrusions or protuberances. These features on the neck 12 are shown as longitudinally extending protrusions 18 and orthogonal or perpendicular extending protrusions 24. As shown, the protrusions 24 intersect or cross the protrusions 18. Another set of protrusions 30 may be defined as those that extend beyond the neck 12 and extend onto the enlarged ends 14.

The protrusions 18, 24 and 30 each extend outward from the exterior surface 32 of the toy, and each having a generally rounded or curved surface. As with the sets of ribs 16, 26 and 28, the protrusions 18, 24 and 30 are also illustrated as having a constant shape and size, but it is also contemplated that any one of these sets of protrusions may also be modified in shape or size to address a specific function of the pet toy as it may relate to the type of animal who is to be present at the toy and the specific functions for which the protrusions are provided.

FIGS. 3 and 4 provide some measured parameters for understanding the general shape and dimensioning of the toy 10 according to one or more preferred embodiments. Distance or dimension 34 represents the length of the neck 12. Distance or dimension 36 represents the portions of the enlarged ends that extend outward or beyond the outer surface of the neck 12. Distance or dimension 38 represents the width or depth of the enlarged ends as viewing the enlarged ends 14 from the respective elevation views of FIGS. 3 and 4. Distance or dimension 39 represents the height of the enlarged ends from the views of FIGS. 3 and 4, this distance 39 also representing the diameter of the enlarged ends if viewing the enlarged ends at FIG. 6.

The dimensioning of the neck 12 and enlarged ends 14 are not limited to any specific arrangement. However, for purposes of explaining a preferred embodiment of the invention illustrated herein, as well as to describe one or more other possible arrangements of these elements, the following general parameters may be applied: According to one preferred arrangement, the dimension 34 may exceed the dimension 36. According to another preferred arrangement, the dimension 39 exceed the dimension 34. According to another preferred arrangement, the dimension 36 may be between about 50 to 90% of the dimension 34. According to another preferred arrangement, the dimension 39 may be at least twice or three times larger as the dimension 36.

By having dimension 39 exceed dimension 34, this allows the toy to roll more easily as compared to if the dimension 34 exceeded dimension 39. In the latter case, the extended length of the neck 12 may introduce some wobble to the enlarged ends 14 caused by the neck twisting as the toy rolls or bounces.

Figure 5:
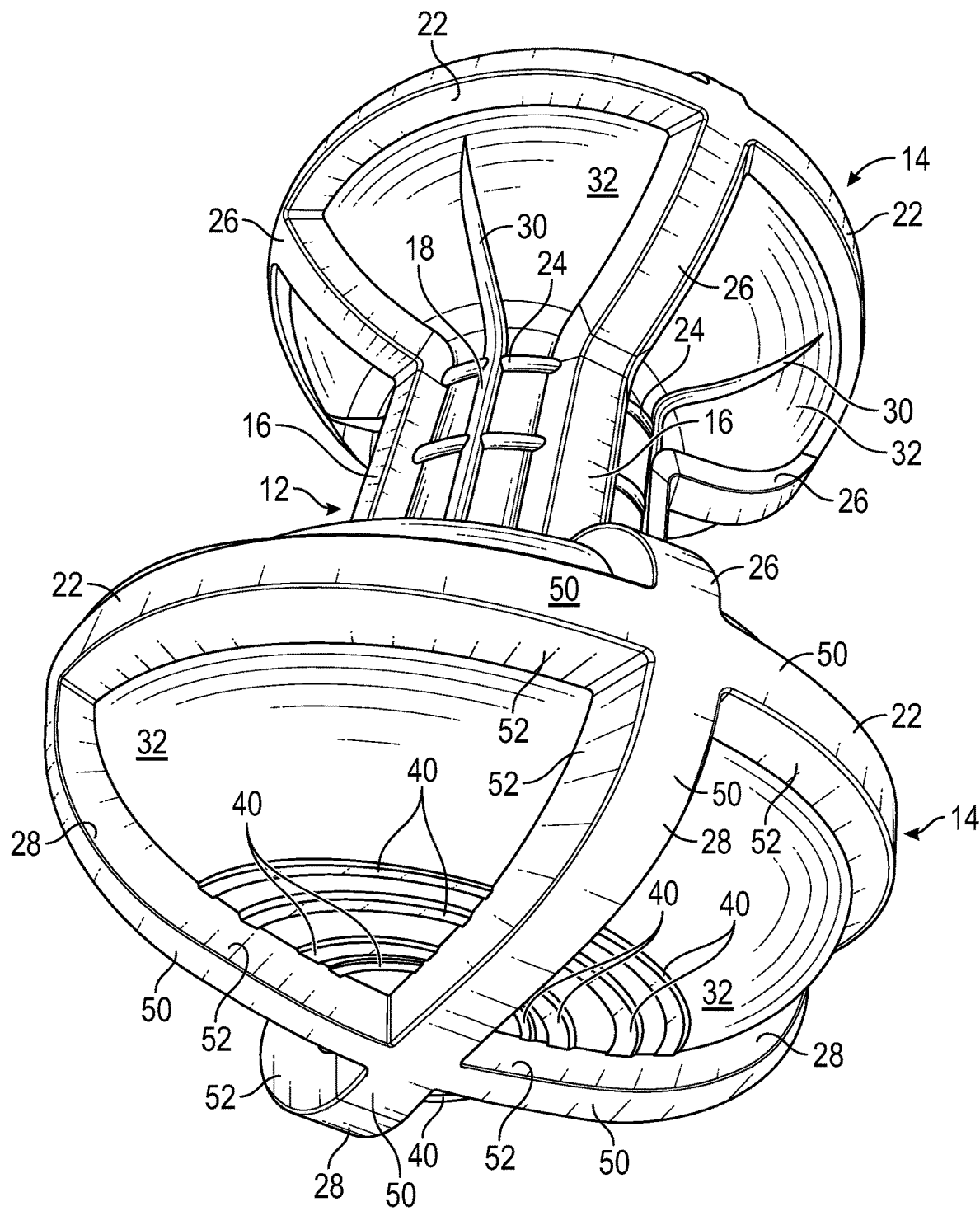
FIG. 5 is a greatly enlarged perspective view of the pet toy of the invention.
Figure 6:
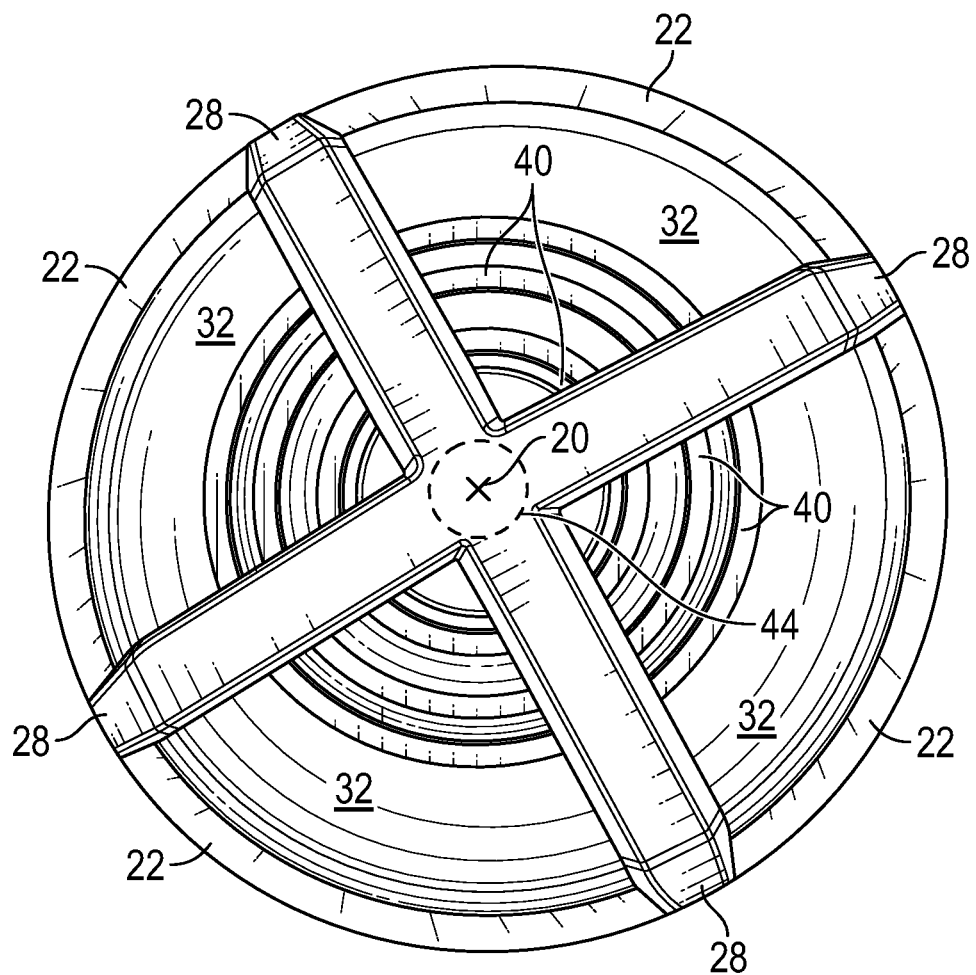
FIG. 6 is a greatly enlarged end view of the pet toy of the invention.

Referring also to the end views at FIGS. 5 and 6, it is shown that the ribs 28 converge at an intersection point or area 44. Accordingly, the ribs 28 appear in a X-shape or crossing pattern. One should also appreciate that the ribs 28 located on the end surfaces of the enlarged ends 14 also provide substantial support thereby allowing the enlarged ends 14 to return to their normal shapes after being deformed by contact with an animal. Yet additional external features of the invention are shown on the outside surfaces of the enlarged ends 14, namely, a plurality of concentric ribs 40. As best seen in FIG. 6, these concentric ribs 40 are geometrically centered around the longitudinal axis 20. As with the other rib structures, the ribs 40 also provide additional support and rigidity to the outside surfaces of the enlarged ends 14. With the added support of the concentric ribs 40, the toy is able to bounce on its enlarged ends 14 which enhances play opportunities with an animal.

Referring specifically to FIG. 5, the specific shape of the ribs 16, 26, and 28 can each be further described as having planar or flat outer sides 50 and planar or flat side services 52 that extend at an angle from the outer sides 50. Contrast this geometric shape of the ribs as compared to the shapes of the protrusions 18, 24 and 30 that have generally rounded shapes.

Figure 7:
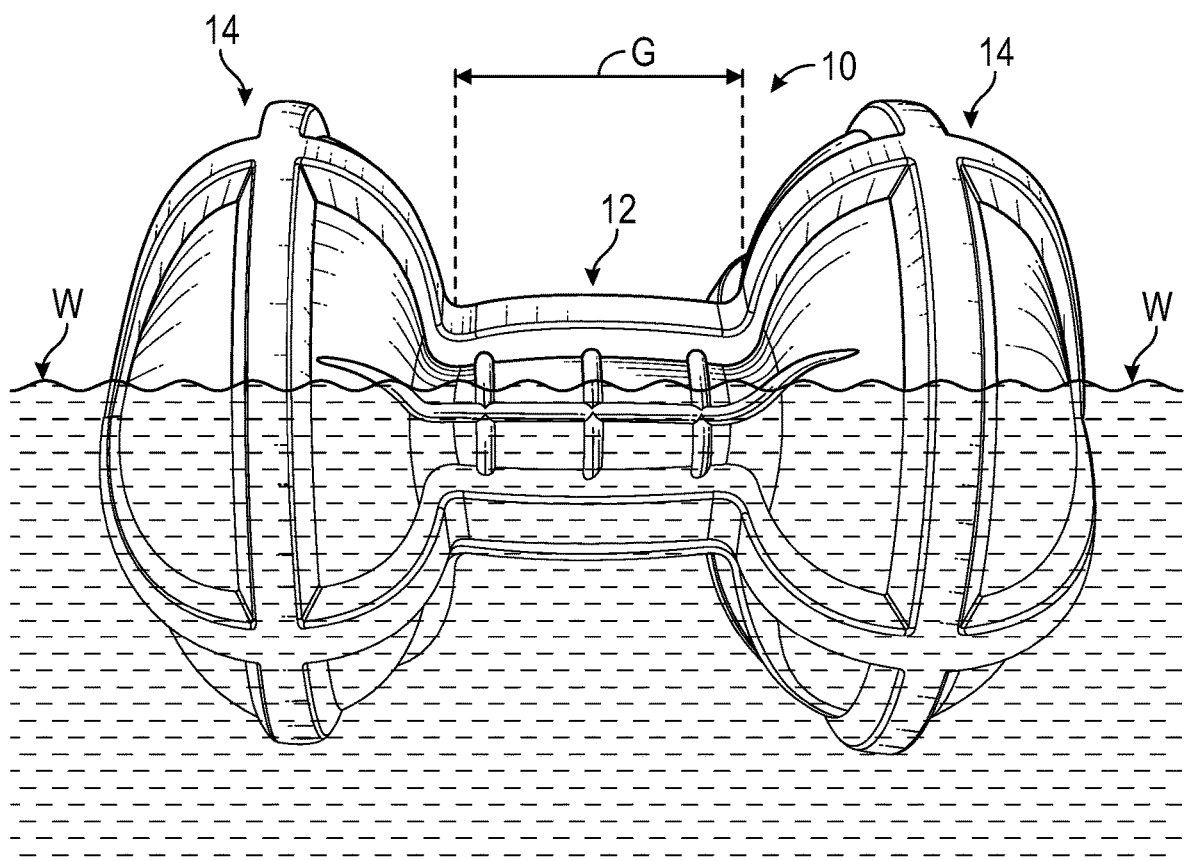
FIG. 7 is an enlarged elevation view showing the pet toy floating in water.

Referring to FIG. 7, the toy 10 is shown floating in water. Therefore, according to another aspect of the invention, the toy is buoyant in which portions of the enlarged ends 14 and the neck 12 are above the water line W. For play and retrieval of the toy, a dog can target grasping the toy in its mouth by focusing on the gap G between the enlarged ends. In testing, dogs consistently grasped the pet toy by placing their muzzles in the gap G and biting on the neck 12. The visual presentation of the toy in its buoyant position in water therefore makes the toy 10 ideal for training and play of a dog in water.

The float characteristics of the toy can be adjusted by increasing or decreasing the weight of the toy, and/or by adjusting the sizes of the enlarged ends 14 and neck 12 that are hollow. It may be desirable to design the pet toy such that it sets higher or lower in the water. With respect to the portions of the enlarged ends 14 encompassed by dimension 36, these portions, when viewed from the elevation view of FIG. 3, have a half spheroid or half football-shapes as opposed to a semi-circular or half sphere shapes. Accordingly, these portions of the ends extend higher above the water line W which makes the pet toy easier to see in the water by a dog.

The toy is preferably made from a flexible and elastomeric material, such as a rubber compound material. The toy is preferably hollow wherein a thickness of the material is variable depending upon where the toy is analyzed in cross-section. However, the exterior features formed on the toy, according to like category, are preferably the same in thickness or height. More specifically, the thickness of the toy at areas 32 are preferably uniform, the thickness of each of the ribs are preferably uniform, and the thickness of the protrusions are also preferably uniform throughout the toy.

One skilled in the art should appreciate that because of the number of ribs and protrusions that traverse the outer surface of the toy, and the geometric arrangement of the ribs and protrusions which reinforce the outer surface of the toy, the pet toy has a very robust construction to extend the life of the toy. For example, the biting action of an animal can occur anywhere along the outer surface of the toy however, because of the number and spacing of ribs and protrusions provided, it does not provide any significant portion of the outer surface without stiffening support by one or more ribs and/or protrusions.

Yet another advantage of the ribs and protrusions is that the robust construction of the toy is provided to eliminate the need for a thicker outer surface at all areas, which serves to reduce the amount of material required to manufacture the toy.

Yet another advantage of the ribs and protrusions is that these features also provide a unique visual effect, noting that the ribs and protrusions are geometrically arranged to be symmetrical both longitudinally and transversely.

Yet another advantage of the ribs and protrusions is that these features provide additional surface area for an animal to grasp and hold the toy without slippage.

The gap between the facing sides of the enlarged ends enables a dog's mouth to conveniently fit in the gap which during testing has proven to be a feature that dogs like. One explanation could be that the gap provides a distinct visual feature that naturally draws the dog to place is mouth between the enlarged ends.

One particularly advantageous use of the pet toy is use of the toy as a training device for dogs. The toy can be tossed, bounced or rolled with consistency, meaning that the shape and material of the toy allows for repeatable and controlled movements of the toy. By easily repeatable and controlled movements, a pet owner can therefore elicit a desired response by the animal. For a throwing action, the user can grasp the neck in a repeatable way resulting in consistent throws. For bouncing, the owner can bounce the toy on end or can bounce the toy on its side; both bouncing actions resulting in distinct but repeatable movements of the toy. For rolling, the toy naturally rolls on its ribs 22 which again results in a repeatable movement of the toy.

One advantage regarding the specific shape of the toy with the neck and the enlarged ends is that multiple locations are provided for an animal to bite and hold the toy during use. For example, the enlarged and circular shaped ends allow an animal to grasp and hold the ends regardless of how the toy may be lying on the ground. That is, if both of the enlarged ends of the toy rest on the ground, an animal can grasp any exposed surface of the enlarged ends that extend above the ground. At the same time, the animal can also grasp and hold the neck since there is a space provided between the neck and the ground. If the toy rests upon one end, the opposite exposed and the neck can be grasped.

Another advantageous feature of the invention is that because it is made from a flexible elastomeric material, the toy is capable of bouncing which provides additional play opportunities with the animal.

The toy is capable of being the deformed by bending, stretching, twisting, or compression. The amount of force required to achieve the desired deformation depends upon which particular area of the toy is to be deformed. As mentioned, the ribs provide significant support so that deforming the toy any direction away from the ribs is prevented without exerting some amount of additional force.

According to another aspect of the invention, the toy can be generally described as having a dumbbell shape in which the neck 12 represents a bar that interconnects the enlarged ends 14 that represent dumbbell weights. The structural aspects of the invention that distinguish it from a barbell shape however are the inclusion of the many external features disposed in the unique geometric patterns.

Although the invention described and illustrated herein is set forth in one or more preferred embodiments, it should be understood that the scope of the invention should be interpreted commensurate with the scope of the claims appended hereto. Accordingly, none of the drawings of the invention should be deemed as specifically limiting the invention to the combination of features illustrated. The various features of the invention can be provided in various combinations and sub-combinations, as also set forth in the claims.

What is claimed is:

1. A pet toy comprising;
   a neck;
   a first enlarged end connected to a first end of the neck;
   a second enlarged end connected to a second opposite end of the neck;
   a plurality of ribs disposed on said neck and said first and second enlarged ends; and wherein a first group of ribs is disposed on and extends longitudinally along said neck, a second group of ribs is disposed on and extends continuously with set first set of ribs onto said first and second enlarged ends; and wherein said first and second groups of ribs converge at respective intersection points on said first and second enlarged ends and said first and second groups of ribs therefore form a crossing pattern on said first and second enlarged ends.

2. The pet toy, as claimed in claim 1, wherein:
   said pet toy is symmetrical about the longitudinal axis thereof.

3. The pet toy, as claimed in claim 1, wherein:
   said pet toy is symmetrical about a transverse axis thereof.

4. The pet toy, as claimed in claim 1, further including:
   a plurality of protrusions disposed on said neck and spaced from said first group of ribs, wherein said protrusions have a curved surface.

5. The pet toy, as claimed in claim 1, further including:
   a plurality of protrusions disposed on said neck and said enlarged ends, said plurality of protrusions spaced from said first group of ribs, wherein said protrusions have a curved surface.

6. The pet toy, as claimed in claim 1, wherein:
   said plurality of ribs extend linearly upon the surfaces to which they are attached.

7. The pet toy, as claimed in claim 1, wherein:
   said plurality of ribs each have a planar outer surface and planar side surfaces connected to opposite sides of said planar outer surface.

8. The pet toy, as claimed in claim 1, further including:
   a plurality of concentric ribs disposed on at least one of said enlarged ends.

9. The pet toy, as claimed in claim 1, wherein:
   a length of the neck exceeds a distance the enlarged ends extend outward and beyond an outer surface of the neck.

10. The pet toy, as claimed in claim 1, wherein:
    a diameter of the enlarged ends exceeds a length of the neck.

11. The pet toy, as claimed in claim 1, wherein:
    a diameter of the enlarged ends is greater than a distance the enlarged ends extend outward and beyond an outer surface of the neck.

12. The pet toy, as claimed in claim 11, wherein:
the diameter of the enlarged ends is at least twice as large as the distance enlarged ends extend outward and beyond an outer surface of the neck.

13. A pet toy comprising;
a neck;
a first enlarged end connected to a first end of the neck;
a second enlarged end connected to a second opposite end of the neck;
a plurality of ribs disposed on said neck and said first and second enlarged ends; and
wherein said pet toy has a dumbbell shape in which a diameter of the enlarged ends exceeds a length of the neck; and
a plurality of protrusions disposed on said neck and spaced from said first group of ribs, wherein said protrusions have a curved surface.

14. The pet toy, as claimed in claim 13, wherein:
a first group of ribs of said plurality of ribs is disposed on and extends longitudinally along said neck, a second group of ribs of said plurality of ribs is disposed on and extends continuously with set first set of ribs onto said first and second enlarged ends, and a third group of ribs of said plurality of ribs is disposed on and extends circumferentially around a periphery of each of said enlarged ends.

15. The pet toy, as claimed in claim 13, wherein:
said pet toy is symmetrical about a longitudinal axis thereof.

16. The pet toy, as claimed in claim 13, wherein:
said pet toy is symmetrical about a transverse axis thereof.

17. The pet toy, as claimed in claim 13, further including:
a plurality of protrusions disposed on said enlarged ends.

18. The pet toy, as claimed in claim 13, wherein:
said plurality of ribs extend linearly upon the surfaces to which they are attached.

19. The pet toy, as claimed in claim 13, wherein:
said plurality of ribs each have a planar outer surface and planar side surfaces connected to opposite sides of said planar outer surface.

20. The pet toy, as claimed in claim 13, further including:
a plurality of concentric ribs disposed on at least one of said enlarged ends.

\* \* \* \* \*